March 27, 1956

T. L. EGELSEN 2,739,504

OPTICAL TESTING DEVICE

Filed July 2, 1952

INVENTOR.
THORALF L. EGELSEN
BY
C. R. Miranda
ATTORNEY

March 27, 1956 T. L. EGELSEN 2,739,504
OPTICAL TESTING DEVICE
Filed July 2, 1952 3 Sheets-Sheet 2

INVENTOR.
THORALF L. EGELSEN
BY
C. R. Miranda
ATTORNEY

March 27, 1956     T. L. EGELSEN     2,739,504
OPTICAL TESTING DEVICE

Filed July 2, 1952     3 Sheets-Sheet 3

*INVENTOR.*
THORALF L. EGELSEN
BY
*C. R. Miranda*
ATTORNEY

United States Patent Office 2,739,504
Patented Mar. 27, 1956

2,739,504

OPTICAL TESTING DEVICE

Thoralf L. Egelsen, Belleville, N. J., assignor to Bendix Aviation Corporation, Teterboro, N. J., a corporation of Delaware Application July 2, 1952, Serial No. 296,832

6 Claims. (Cl. 88—14)

This invention in general relates to testing devices and more particularly to comparators which employ optical systems. Specifically, the present invention is directed to a device which utilizes a reflected light beam to determine the difference in angular relationship between the positions of a control member and a controlled member.

In comparators of the type mentioned above, it has been common practice to utilize a reflected light beam to determine the angular discrepancy between the positions of a control member and a controlled member which is to accurately follow the control member. The reflected light beam is made to impinge on a scale which indicates the discrepancy. This arrangement is satisfactory where the discrepancy angle is relatively large and may be easily read on the scale. However, where the discrepancy angle is relatively small, it becomes difficult to obtain a clear and accurate reading of the scale.

The present invention, therefore, contemplates a novel device wherein the angular discrepancy between a control member and a controlled member may be easily determined. The device comprises a light source for projecting a beam of light and is mounted for movement with a control member. Movable with the control member are reflecting means which provide for reflection of the light beam onto a reflector carried by the controlled member, and from there, to a scale movable with the control member, to thereby increase the path of the light beam from the reflector to the scale.

An object of the present invention, therefore, is to provide a novel device for determining the difference in angular relationship between a control member and a controlled member.

Another object is to provide in a comparator a novel optical system for effecting a determination of the angular discrepancy between a control member and a controlled member which follows movement of the control member.

A further object is to provide in a comparator a novel optical system wherein means are provided for increasing the path of a light beam reflected from a mirror carried by a controlled member, to a scale.

The above and other objects and advantages of the present invention will appear more fully hereinafter from a consideration of the detailed description which follows taken together with the accompanying drawings wherein one embodiment of the invention is illustrated.

In the drawings, wherein like reference characters refer to like parts throughout the several views.

Figure 1:
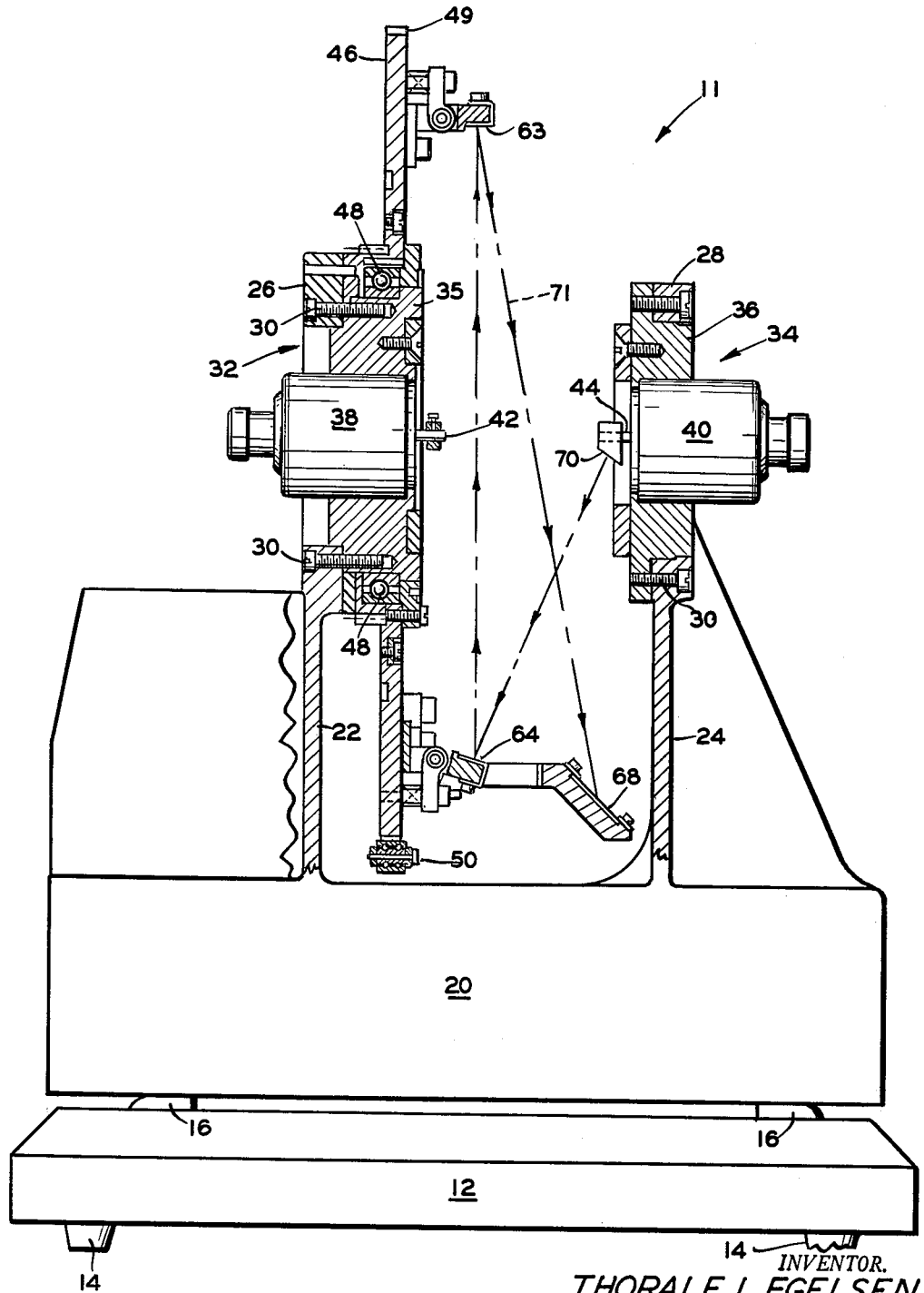
Fig. 1 is a side elevational view, partially in section, of one form of a device embodying the present invention.

Referring now to the drawings for a more detailed description of the present invention, and more particularly to Fig. 1 wherein one embodiment hereof is clearly illustrated, a comparator, generally designated by the numeral 11, is shown as comprising a base 12 having feet 14. Secured to base 12, adjacent feet 14, by shock-mounted brackets 16 and threaded members, not shown, is a cast-metal frame 20.

Frame 20 has integrally formed thereon a pair of spaced upright supports 22 and 24 arranged parallel to each other. The upper portions of supports 22 and 24 are arranged to form annular rings 26 and 28, respectively, each of which has secured thereto as by threaded members 30, clamping means generally indicated by the numerals 32 and 34, respectively. Clamping means 32 and 34 comprise annular base members 35 and 36, respectively, positioned within annular rings 26 and 28 and secured thereto by the threaded members 30. Members 35 and 36 have openings therein for accommodating cylindrical objects which are rigidly secured to the upright supports by the clamping means; the latter being more fully shown and described in the copending application of Lawrence Longden, Serial No. 291,934, filed June 5, 1952, and assigned to the assignee of the present application.

The comparator of the present invention may be employed to test a production "synchro" or inductive device, the term "synchro" being well known in the electro-mechanical control arts as shown, for example, by the references to the term on page 310 et seq. of the volume "Electronic Instruments" of the "M. I. T. Radiation Laboratory Series," specific constructions of "synchro" devices being described in U. S. Patent No. 2,038,059 to W. A. Reichel, issued April 21, 1936, and U. S. Patent No. 2,488,771 to J. P. Glass, Jr., issued November 22, 1949. The production synchro device is tested against a standard or master synchro device in order to determine the error, if any, existing in the production synchro device due to mechanical or electrical defects. To this end, annular ring 26 accommodates a master synchro device 38 which meets the standard desired, while annular ring 28 accommodates a synchro device 40 which is the production synchro device to be tested against the master device. Device 38 has an angularly displaceable rotor 42 while the test device 40 has an angularly displaceable rotor 44. Devices 38 and 40 are electrically connected by leads (not shown) in a self synchronous arrangement wherein the stator windings (not shown) of the devices are connected "back-to-back." Since self-synchronous arrangements are well known to those skilled in the art, it is not believed necessary to further describe and illustrate the connection between the devices 38 and 40. Such arrangements are described, for example, in the aforementioned U. S. Patent No. 2,038,059. In self-synchronous systems the rotor of the master transmitter device is mechanically rotated and the rotor of the receiver device must accurately follow or pace it. However, if there is a difference in the angular relationship between the positions of the rotors when the master rotor is mechanically rotated, and the difference is beyond certain prescribed limits, then the production device is defective.

Figure 2:
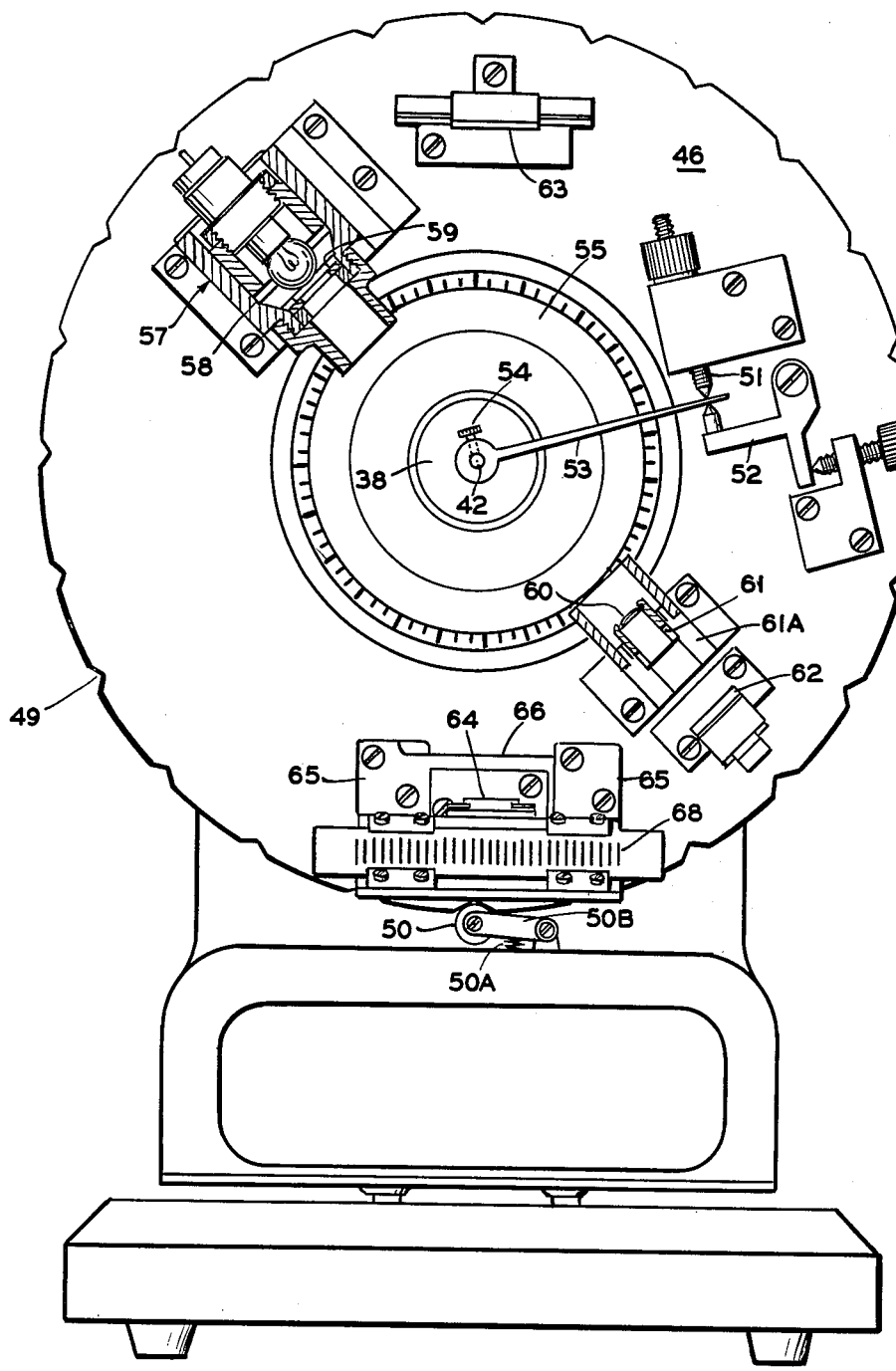
Fig. 2 is a front elevational view of the device of Fig. 1 having a portion thereof removed for purposes of clarity.

The comparator 11 determines the above angular relationship in providing an index disc 46 (Figs. 1 and 2) which is rotatable on bearing 48 positioned on annular member 35. Disc 46 has a plurality of notches 49 cut in the periphery thereof which cooperate with a pivoted roller bearing-type detent 50 to limit rotation of the disc to desired predetermined angular positions. Detent 50 is yieldably urged into engagement with disc 46 by spring means 50A but may be disengaged by merely pressing a lever 50B mounting the detent downwardly and away from the disc. Disc 46 is operated manually but it is apparent that any conventional motor driven means may be employed to rotate it.

Arranged on disc 46 are a pair of adjustable members 51 and 52 (shown only in Fig. 2 for purposes of clarity) for clamping therebetween one end of an arm 53 secured to rotor 42 of device 38 by a set screw 54 threaded in the arm and engaging the rotor. By means of the foregoing structure wherein the housing of device 38 is fixed and the production test device 40 is responsively connected electrically with the transmitter device 38, rotation of disc 46 will effect rotation of rotor 42, through a plurality of angular positions to thereby displace rotor 44 of the test device 40 theoretically through the same positions. To provide an indication of the displacement of master rotor 42 from a null or zero position, a plate 55 having indicia thereon calibrated in degrees is mounted on base member 35 and cooperates with arm 53 to afford a visual indication of the position of the rotor.

Secured to disc 46 and directed toward the center thereof is a lamp housing 57 (shown only in Fig. 2 for purposes of clarity) which accommodates an incandescent lamp 58 connected to a source of electrical energy (not shown) by way of electrical conductors (not shown). An opaque member 59 having a slit formed therein is positioned in housing 57 in front of lamp 58. Arranged opposite housing 57 is a focusing lens 60 secured in a housing 61 which is mounted on a bracket 61A fastened to the disc. Disposed behind housing 61 and secured diametrically opposite lamp 58 is a reflector or mirror 62 mounted on the disc. A second mirror 63 is arranged adjacent lamp housing 57 and is mounted on disc 46 opposite a third mirror 64 similarly mounted for rotation with the disc. Mirror 64 is positioned between a pair of legs 65 of a bracket 66 which is fixed to and extends outwardly from the disc (Fig. 1) and carries a rectangular shaped scale 68 having graduations formed thereon. Fixedly secured to and carried by rotor 44 is a mirror 70 which normally is positioned to face a point midway between mirrors 62 and 64.

Figure 3:
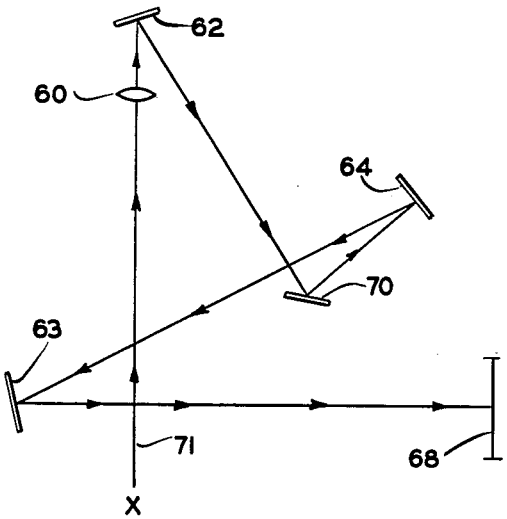
Fig. 3 is a schematic illustration of the arrangement of the optical system of the device of Fig. 1.

The foregoing optical arrangement enables an indication of the relative positions of rotors 42 and 44. In Fig. 1 a portion of the path of travel of the light beam is shown, while Fig. 3 shows the entire path of travel of the light beam which is designated by the numeral 71. Light beam 71 emerges from lamp housing 57 (Fig. 3) as a slit-like beam which passes through lens 60 to impinge against mirror 62. Mirror 62 is arranged at such an angle with respect to light beam 71 that the latter does not strike the mirror normal to the plane thereof but rather at an angle so that the beam is not reflected back to the light source. The beam from mirror 62 strikes mirror 70 on rotor 44 and is reflected onto mirror 64 from whence it strikes mirror 63 to be reflected onto scale 68. If rotors 42 and 44 are in the same angular positions, light beam 71 impinges on scale 68 at a point midway between the ends thereof. When rotor 44 lags or leads rotor 42, beam 71 is moved either to the left or to the right of the midway point. In this manner, any discrepancy between the rotor positions may be determined directly and immediately simply by reading the position of the slit-like beam of light on scale 68.

The arrangement of the optical system of the present invention provides for accurate readings of the variations in "spread" of the test synchro; "spread" being defined herein as the total discrepancy variation of a test rotor with respect to the standard synchro rotor, from a maximum in one direction to the maximum in the other direction.

Figure 4:
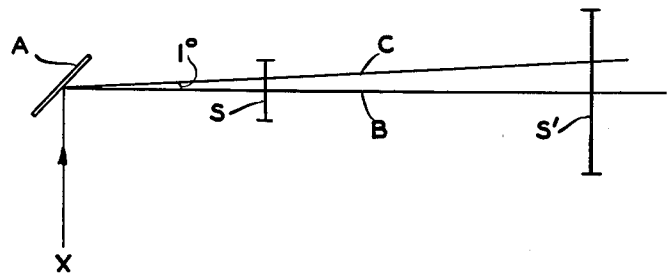
Fig. 4 is a diagrammatic representation illustrating in one aspect the principle of the present invention.

Fig. 4 illustrates in one aspect the principle upon which the present optical system operates and the advantages thereof. For example, if "X" is considered a light source which is movable with the rotor of the standard or master device 38 and mirror A is mounted on the rotor of the test device 40, corresponding angular positions of the rotors will effect the impingement of a light beam B midway on a scale S which is mounted for movement with a light source. If a discrepancy of one degree between the angular positions of the rotors occurs, for example, then a light beam C displaced one degree from the position of light beam B impinges at some point on scale S away from the midpoint. In Fig. 4, no reflectors are considered to be positioned between mirror A and scale S. However, if the path of the light beam from mirror A to the scale is extended such as by placing additional reflectors therebetween to obtain impingement of the light beam on a larger scale $S^1$, then an arrangement is obtained in accordance with the present invention. This is accomplished in the present application by placing reflectors 63 and 64 between mirror 70 and scale 68 to extend the path of the light beam therebetween. In this manner, a larger scale with finely divided graduations may be employed to obtain more accurate readings. The advantages of increasing the light path become readily apparent when it is considered that the allowable spread of present synchro devices must be held to a very small spread, such as, less than one degree.

It will now be apparent that the present invention provides a novel optical comparator especially useful for accurately determining the difference in angular relationship between a control member and a controlled member. By providing an optical arrangement which extends the path of the light beam reflected from a mirror carried by the controlled member, to a scale mounted for movement with a control member, a larger scale may be employed to increase the accuracy of readings of the difference in positions of the members.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Apparatus for determining the difference in angular relationship between the positions of an angularly displaceable control member and an angularly displaceable controlled member wherein the controlled member follows the position of the control member, comprising a rotatable member movable to a plurality of predetermined angular positions, means connecting one of said displaceable members to the rotatable member for movement therewith, a light source for projecting a beam of light and mounted on said rotatable member, a reflector carried by said rotatable member and arranged diametrically opposite said light source and in the path of the beam of light, a mirror mounted on the other of said displaceable members and positioned in the path of the light beam from said reflector, a second reflector carried by said rotatable member and arranged to receive the beam of light from said mirror, a third reflector carried by said rotatable member and arranged diametrically opposite said second reflector for receiving the beam of light from the second reflector, and a scale mounted on said rotatable member and arranged in the path of the beam of light from said third reflector to provide an indication of the angular relationship between said displaceable members.

2. In a device for providing a direct comparison between the positions of a movable controlled member and a movable control member which controls the position of said controlled member but wherein said controlled member may not be in exact positional agreement with said control member, a reflector mounted for movement with one of said members, means mounted for movement with the other of said members for directing a beam of light onto said reflector for reflection therefrom, means for measuring the deflection of said reflected beam of light including a light-receiving device movable with said other member for receiving said reflected beam of light to measure the difference in positions between said members, and means for extending the path of said reflected beam of light between said reflector and said light-receiving device comprising optical means movable with said other member for receiving and directing to said light-receiving device the beam of light from said reflector to magnify the displacement of the beam of light with respect to said light-receiving device.

3. In a device for determining the relative displacement between an angularly displaceable first member and an angularly displaceable second member which may not be in exact positional agreement with said first member, a reflector mounted for movement with one of said members, means mounted for movement with the other of said members for directing a beam of light onto said reflector for reflection therefrom, means for measuring the deflection of said reflected beam of light including a light-receiving device for measuring the difference in positions between said members, and means for extending the path of said reflected beam of light between said reflector and said light-receiving device comprising reflecting means mounted for movement with and at the same speed as said other member for receiving and reflecting onto said light-receiving device the beam of light from said reflector.

4. In a device for providing a direct comparison between the positions of a movable controlled member and a movable member which controls the position of said controlled member but wherein said controlled member may not be in exact positional agreement with said control member, a first reflector mounted for movement with one of said members, means mounted for movement with the other of said members for directing a beam of light onto said first reflector for reflection therefrom, a scale movable with said other member for receiving said reflected beam of light to indicate the difference in position between said members, and means for extending the path of the light beam between said reflector and said scale to magnify the displacement of the light beam with respect to said scale, said last-mentioned means comprising a plurality of additional reflectors each movable with and at the same speed as said other member and each disposed in the path of the light beam from said first reflector for reflecting the light beam from said first reflector onto said scale.

5. Apparatus for providing a direct comparison between the angular positions of an angularly displaceable control member and an angularly displaceable controlled member wherein the controlled member follows the position of the control member but wherein said controlled member may not be in exact positional agreement with said control member, comprising a rotatable member movable to a plurality of predetermined angular positions, means connecting one of said displaceable members to the rotatable member for movement therewith, a light source for projecting a beam of light and mounted on said rotatable member, a reflector movable with the other of said members, a scale carried by said rotatable member, and a plurality of reflecting means mounted on said rotatable member and positioned to reflect the light beam from said reflector onto said scale to provide a direct indication of the angular relationship between said displaceable members.

6. A comparator for directly comparing the relative displacement between a movable controlled member and a movable controlling member wherein said controlled member may not be in exact positional agreement with said control member, comprising a light source movable with one of said members and providing a beam of light, a light reflector movable with the other of said members and in the path of said light beam to reflect said light beam, means for measuring the deflection of the reflected beam of light including a light-receiving device movable with said one member for receiving the light beam reflected by said reflector, the magnitude of displacement of the reflected beam of light relative to a predetermined reference point on said light-receiving device being a direct measure of the magnitude of the relative displacement of said members, and optical means interposed between said light-receiving device and said reflector for magnifying the displacement relative to said reference point of the reflected beam of light received by said device from said reflector.

References Cited in the file of this patent

UNITED STATES PATENTS

| | | |
|---|---|---|
| 1,293,768 | Harvey | Feb. 11, 1919 |
| 2,347,702 | Maris | May 2, 1944 |